UNITED STATES PATENT OFFICE.

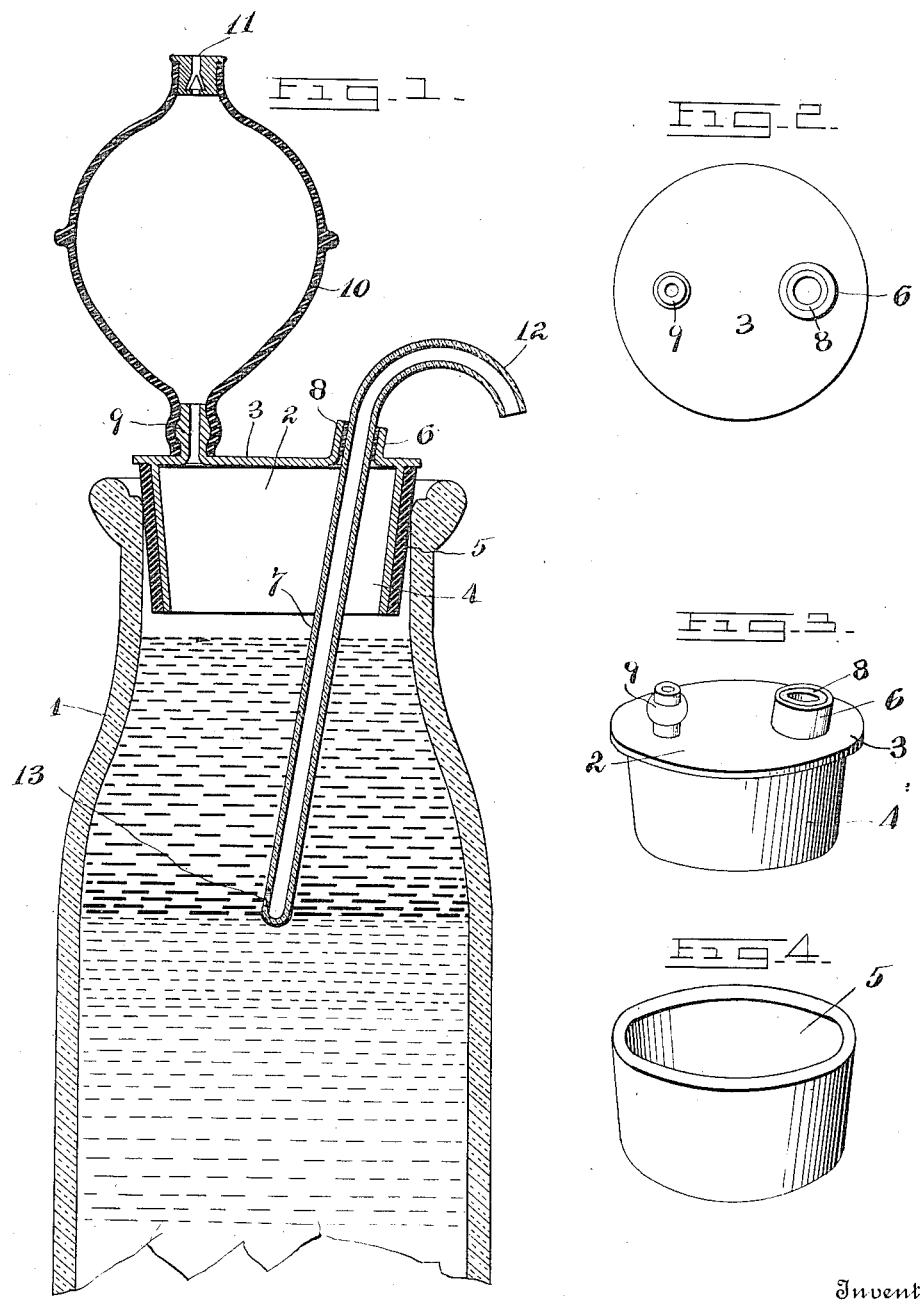

JOHN E. JEANSON, OF HICKSVILLE, NEW YORK.

LIQUID-SEPARATOR.

985,598.

Specification of Letters Patent.  Patented Feb. 28, 1911.

Application filed October 18, 1910. Serial No. 587,682.

*To all whom it may concern:*

Be it known that I, JOHN E. JEANSON, a citizen of the United States, residing at Hicksville, in the county of Nassau and State of New York, have invented new and useful Improvements in Liquid-Separators, of which the following is a specification.

The present invention provides unique means for drawing off liquid contained in a receptacle, the same being particularly adapted for removing the cream from milk bottles without disturbing the milk, said means being of such construction as to admit of the parts being thoroughly cleansed and the discharge tube adjusted to the depth of the cream to be drawn off.

The invention contemplates a hollow stopper, a discharge tube adjustable in the stopper and having a close fit therewith at all adjustments, said tube having a lateral opening at its lower end for the entrance of the cream when removing the same from the bottom, and a compression device fitted to the stopper for creating a pressure upon the liquid whereby the cream is caused to flow through the discharge tube.

The invention consists of the novel features, details of construction and combination of parts, which hereinafter will be more particularly set forth, illustrated in the accompanying drawing, and pointed out in the appended claim.

Referring to the drawing, forming a part of the application, Figure 1 is a vertical central section of a liquid separator embodying the invention, showing the same in position. Fig. 2 is a top plan view of the stopper. Fig. 3 is a perspective view of the stopper. Fig. 4 is a perspective view of the band or packing fitted to the rim of the stopper.

Corresponding and like parts are referred to in the following description, and indicated in all the views of the drawing, by the same reference characters.

The numeral 1 designates a bottle or jar such as commonly used for receiving milk.

2 designates the hollow stopper which comprises a top 3 and a pendent rim 4, the latter tapering slightly toward its lower end. A rubber band 5 is fitted to the rim 4 and insures a close fit between the stopper and the mouth of the receptacle or bottle 1. An opening is formed in the top 3 and a collar 6 in line with said opening projects upwardly from the top and receives the discharge tube 7. A rubber band or sleeve 8 is fitted within the collar 6 and insures a close fit between the collar and the discharge tube 7 and also serves to hold the discharge tube in the required adjusted position. A coupling 9 is fitted in an opening formed in the top 3 and has the lower end of a rubber bulb 10 fitted thereto, said bulb providing a compression device whereby a pressure may be created within the upper part of the bottle 1 to force the cream therefrom through the tube 7. The upper end of the bulb 10 is provided with a valve mechanism 11 for admitting air into the bulb and confining the same upon compressing the bulb to force the air therefrom into the bottle 1.

The discharge tube 7 has its upper end curved to form a spout 12 for convenience of discharging cream into a cup or kindred vessel. The lower end of the tube is closed, thereby preventing the liquid from flowing vertically into the lower end of the tube. A lateral opening 13 is formed in a side of the tube at or near its lower end, thereby enabling the liquid to pass horizontally into the tube without disturbing the heavier portion upon which the lighter part is supported. By locating the entrance opening 13 in a side of the tube the latter may be adjusted to approximately the line of demarcation separating the cream from the milk so as to draw off the cream without agitating the milk, thereby enabling a maximum percentage of the cream to be drawn off.

From the foregoing it will be understood that the appliance may be quickly separated to admit of the parts being thoroughly cleansed, which is of vital importance in a device of this nature when utilized in the manner stated for removing cream from milk bottles or jars.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

The herein described liquid separating device comprising a hollow stopper embodying a top and a pendent rim slightly tapered, a packing band encircling the rim of the stopper, the top of the stopper having two openings one of which is provided with a collar and the other having a coupling, a compression bulb fitted to said coupling, a packing fitted within the said collar, and a discharge tube insertible in and removable through said collar and having its upper end curved to form a spout and having its lower end closed and provided in a side above the closed end with a receiving opening.

In testimony whereof I affix my signature in presence of two witnesses.

JOHN E. JEANSON.

Witnesses:
SAMUEL P. POOLE,
HENRY FUCHS.